United States Patent

[11] 3,577,586

| [72] | Inventors | Frank Kalwaites<br>Somerville;<br>Peter L. Doviak, Kendall Park, N.J. |
|---|---|---|
| [21] | Appl. No. | 692,006 |
| [22] | Filed | Dec. 20, 1967 |
| [45] | Patented | May 4, 1971 |
| [73] | Assignee | Johnson & Johnson |

[54] APPARATUS FOR CONTINUOUSLY TRANSVERSELY STRETCHING ORIENTABLE SHEET MATERIAL
8 Claims, 7 Drawing Figs.

| [52] | U.S. Cl. | 18/1 |
|---|---|---|
| [51] | Int. Cl. | B29g 7/00 |
| [50] | Field of Search | 18/1 (FB) |

[56] References Cited
UNITED STATES PATENTS

| 2,328,827 | 9/1943 | Martin | 18/1FB |
|---|---|---|---|
| 2,988,772 | 6/1961 | Horn | 18/1FB |
| 3,046,599 | 7/1962 | Nicholas et al. | 18/1FB |
| 3,063,090 | 11/1962 | Koppehele | 18/1FB |
| 3,110,927 | 12/1963 | Koppehele | 18/1FB |
| 3,172,151 | 3/1965 | Glossman | 18/1FB |
| 3,179,977 | 4/1965 | Nash | 18/1FB |
| 3,247,544 | 4/1966 | Bromley | 18/1FB |
| 3,254,148 | 5/1966 | Nichols | 18/1FBX |
| 3,261,903 | 7/1966 | Carr | 18/1FBX |
| 3,303,528 | 2/1967 | Gageur et al. | 18/1FB |

Primary Examiner—J. Spencer Overholser
Attorneys—Alexander T. Kardos, Arnold S. Worfolk and Robert L. Minier ABSTRACT: Method and apparatus for transversely stretching sheet material wherein the material is moved in its longitudinal direction, tension is applied in the transverse direction, the material heated and uniformly stretched in its transverse direction at a rate sufficient to orient the material. After the material is uniformly transversely stretched the desired amount the edges of the material are kept parallel and the material cooled. The apparatus comprises means for applying tension in the transverse direction of continuously moving sheet material, means for heating the material while said tension is applied, a pair of diverging conveyors which diverge at an angle greater than 40°, the diverging conveyors having clamping means which clamp the edges of the material to uniformly transversely stretch the material as the conveyors diverge and means for removing the continuously moving sheet material from the clamping means of the diverging conveyors while maintaining the edges of the material substantially parallel and under control.

INVENTORS:
FRANK KALWAITES
PETER L. DOVIAK

APPARATUS FOR CONTINUOUSLY TRANSVERSELY STRETCHING ORIENTABLE SHEET MATERIAL

This invention relates to method and apparatus for transversely stretching sheet material which can be oriented and more particularly to a method for uniformly transversely stretching orientable sheet material to a sufficiently high degree so that the oriented material has good strength and, in certain instances, may be split or fibrillated.

In forming what we term split fiber webs, that is, webs of mutually interconnected fibers from plastic films, it is necessary to highly orient the film in one direction. By high orientation it is meant orientation of from 4:1 to 15:1 or even higher. When orienting to produce fibers the molecules or crystals of the plastic film must be free to move and align themselves in the direction of orientation. There should be little, if any, restraining force which will reduce the mobility of the molecules within the plastic film.

In practice it is desirous to carry out the process on a continuous basis. There are of course a number of present day methods for continuously orienting films in the longitudinal direction. However, none of these methods are adaptable to produce the same type of orientation in the transverse direction of the film. The reason for this, it is believed, is that because a continuous method is desired the film must always be moved in the longitudinal direction as it is being processed and by so doing there is virtually always a force perpendicular to the direction of the desired orientation which prevents or greatly reduces the orientation of the film in the transverse direction. When stretching plastic netting the force caused by the longitudinal movement of the netting is not as important because the openness or discontinuity of the netting absorbs and reduces the effect of this longitudinal force. Even so, the netting must be stretched transversely a considerable amount in order to produce an increase in the strength of the netting due to orientation of the plastic material.

One mechanism for transversely orienting sheet materials is known as a tenter frame which basically comprises a pair of diverging conveyors which grip the edges of the film and diverge to stretch the film in a transverse direction. However, there are a number of major faults with such mechanisms when used to transversely orient plastic sheet materials. One is that the material must have transverse forces applied uniformly and standard tenter frames will not accomplish the desired results. Another, and more critical factor, is that when being removed from the tenter frame forces must not be applied to the film which would disrupt the desired transverse orientation. Furthermore, standard tenter frames do not diverge a sufficient amount to produce the desired orientation in plastic sheet materials.

I have now discovered method and apparatus for overcoming these objects and in my new and improved method and apparatus I uniformly apply diverging forces to the material throughout its transverse orientation process and once I have it oriented sufficiently I may remove these transverse oriented forces without disruption of the orientation. Furthermore, I can accomplish all of this on a continuous basic.

The plastic material treated in accordance with the present invention may be any of the orientable polyolefins, such as polyethylene or polypropylene or other orientable synthetic polymers such as the polyamides, polyesters, etc. The material may be in the form of a thin continuous film having a smooth, embossed or patterned surface or it may be in the form of a netting having a square, diamond or other pattern of openings. In accordance with the present invention plastic material capable of being oriented is conveyed in its longitudinal direction. Tension is applied to the material in the cross direction or transverse direction of the material while it is being conveyed. This tension is sufficient to remove any slack in the material but not to stretch the material in the transverse direction any substantial amount. The material is heated to make its molecules more mobile but not melt the material. The amount of heat of course will depend on the composition of the material being treated and it generally ranges from about 200° F. to 450° F. While in the heated state the edges of the material are diverged from each other at an angle of greater than 40° over a length sufficient to produce an orientation in the material from about 4:1 to 15:1. Upon obtaining the desired orientation in the material the diverging forces are removed while maintaining the edges of the material parallel to each other. The material is cooled to produce a transversely oriented plastic material having excellent cross strength.

The apparatus for carrying the above method into practice comprises a pair of endless conveyors having clamping means along their entire length. The conveyors are mounted in the same plane, preferably a horizontal plane and each conveyor passes through a first flight, a second flight and a return flight. The first flight of said conveyors move in the same direction, are spaced apart and diverge from each other at an angle of less than 10°. The second flights of each conveyor move in the same direction and diverge from each other at an angle of from about 40° to 170°. The return flight of each conveyor returns the conveyor to its respective first flight. Supply means are provided for supplying material to be treated to the first flights of said conveyors. Means for heating the first and second flights of said conveyors are also provided. The apparatus also includes means for activating said clamping means at the start of said first flights to clamp the edges of the material supplied, means for deactivating said clamping means at substantially the end of said second flight to release the material, and means for substantially immediately gripping the edges of the material after it has been released by said clamping means and conveying said material away from said second flight while maintaining the edges of the material parallel. The material may be allowed to cool, the edges trimmed and the material wound into roll form by conventional windup mechanisms.

If desired the gripping and conveying means may have a linear speed greater than the linear speed of the material as it passes through the second flight whereby the material is drafted as it is released by the clamping means. This drafting operation is especially adaptable to the processing of plastic netting.

It is important that the clamping means be as close together as possible on the endless conveyors and the shorter any individual clamping means the closer they remain as they pass from the first flight to the second flight of the conveyor and the more uniform the transverse forces applied to the material being treated. It is preferable that the clamping means be positioned substantially on the pitch line of the conveyors to maintain as close a spacing as possible throughout the entire first and second flight of the conveyors and to provide uniform transverse forces to the material treated.

The invention will be more fully described in conjunction with the accompanying drawings wherein.

Figure 1:
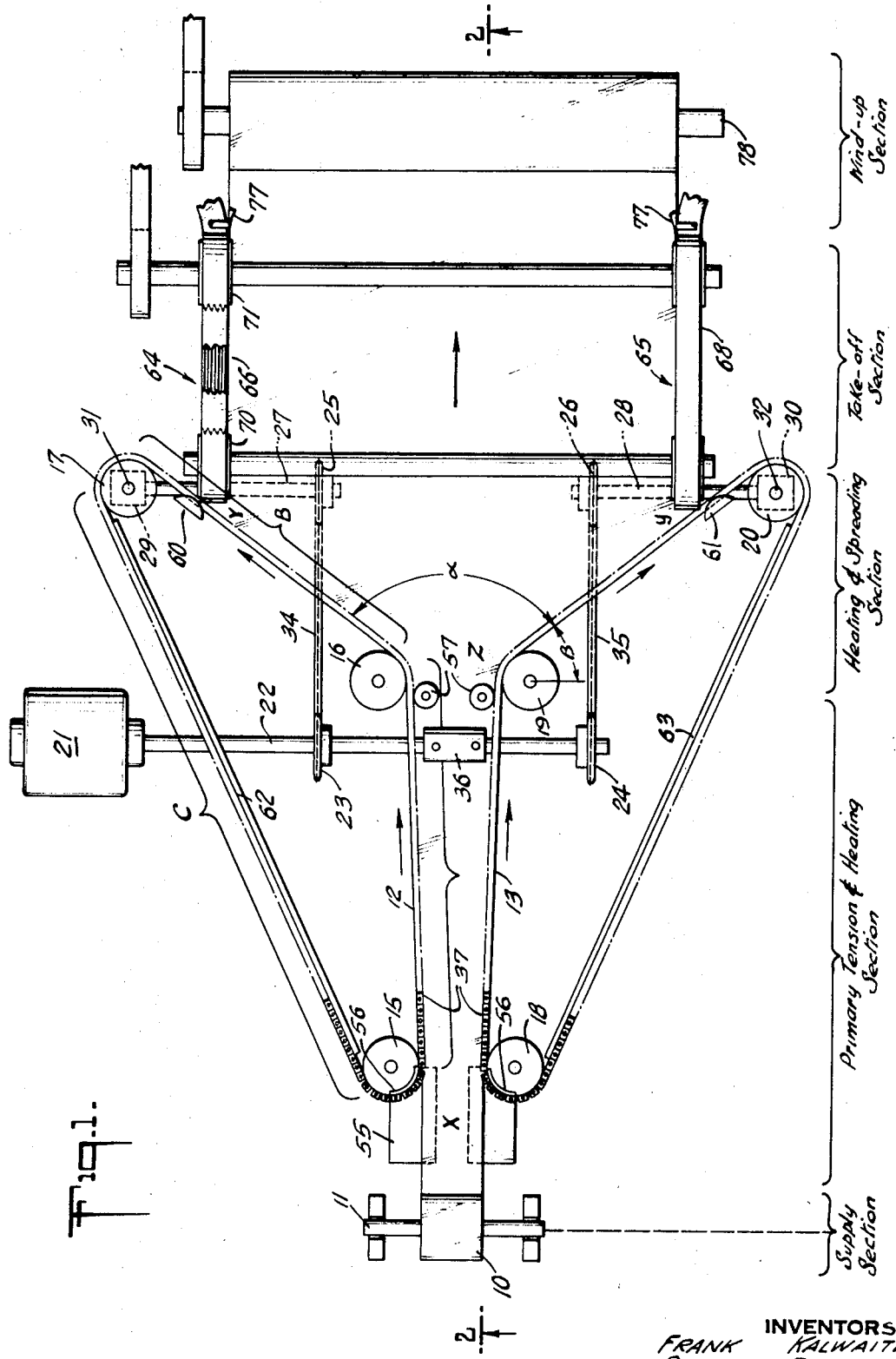
FIG. 1 is a schematic top view of apparatus in accordance with the present invention.
Figure 2:
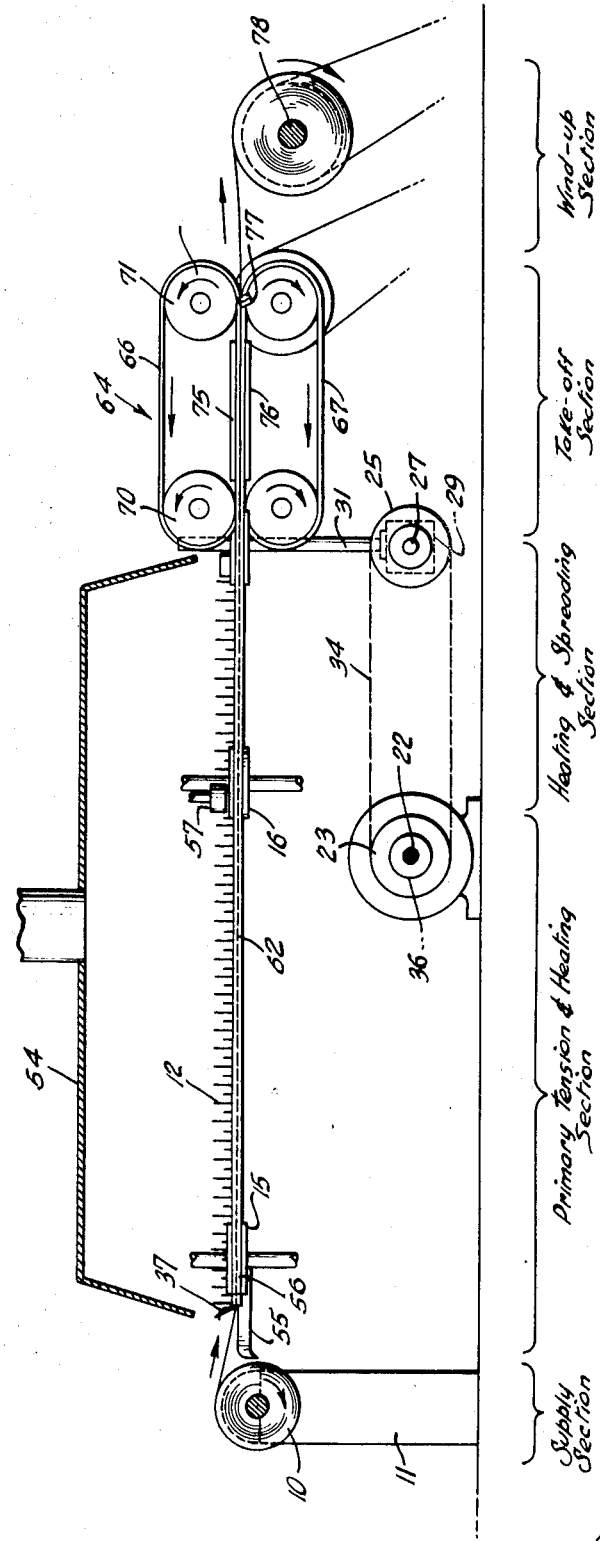
FIG. 2 is a schematic side view of the apparatus depicted in FIG. 1 taken along line 2—2.
Figure 5:
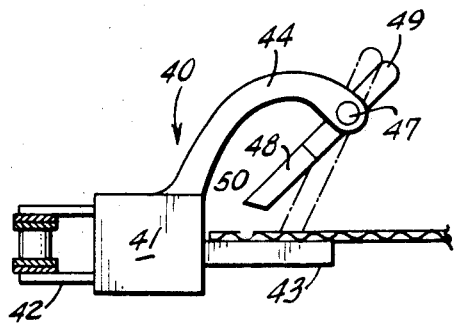
FIG. 5 is an enlarged side view of other clamping means useful in conjunction with the apparatus depicted in FIGS. 1 and 2.
Figure 6:
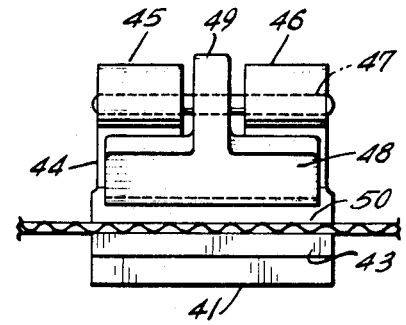
FIG. 6 is a schematic top view of the clamping means depicted in FIG. 5.

Referring to FIGS. 1 and 2 there is depicted a roll of material 10 which is to be processed by the apparatus of the present invention and stretched in its transverse direction, that is the direction of its width, to orient the material in the transverse direction. The roll of material is mounted on a suitable supply frame 11 so that it is readily rotatable and may be easily rotated to feed the material to the apparatus. The material is supplied to a pair of diverging endless chains 12 and 13 preferably mounted in the horizontal plane. The diverging chain moves in the direction of the arrows shown. The diverging chain 12 moves about a first sprocket 15 to a second sprocket 16 to a third sprocket 17 and is returned to the first sprocket. These sprockets are mounted on shafts which are mounted for rotation in suitable framing. The various framing to hold the sprockets and the shafts etc. have not been shown in the drawings for the purpose of clarity. By a similar means the chain 13 is mounted on three similar sprockets 18, 19 and 20 and moves in the direction of the arrow shown. The chains are driven through the sprockets. The driving means is a motor 21 having a shaft 22 extending underneath both diverging chains. Mounted on this shaft are a pair of pulleys 23 and 24. In line with these pulleys are a second pair of pulleys 25 and 26 mounted on shafts 27 and 28 respectively and in line with sprockets 17 and 20. These shafts 27 and 28 extend underneath the sprockets and through standard right angle drive means 29 and 30 drive the shafts 31 and 32 on which the sprockets 17 and 20 are mounted. The pulleys 25 and 26 are driven by means of suitable belts 34 and 35. The entire diverging chain 13 with its corresponding sprockets 18, 19 and 20 and shaft 28 etc. are slidably mounted in the framing so that they may be positioned closer to or further away from the diverging chain 12. The drive shaft 22 from the motor has a suitable, adjustable coupling 36 to provide drive for the slidably movable chain mechanism. Mounted on both chains along their entire length and as reasonably close together as possible are a series of clamping means 37. These clamps are more clearly depicted in FIGS. 5 and 6. The base 41 of the clamp 40 is welded or otherwise connected to the chain 42 and at the bottom portion of this piece there is an outwardly extending table portion 43. The top of the base is a curved portion 44 which at its outwardly end extends into two curved arms 45 and 46 one at each side of this outwardly curved portion 44. An aligned hole 47 passes through the curved arms and inserted herein is the movable bar 48. The movable bar is a shaft mounted in the hole and in the center of this shaft positioned between the two curved arms is a pivotal arm 49. The pivotal arm extends downwardly towards the table portion and at its bottom widens into a pressing portion 50 so that when the arm is closest to the vertical position the pressing portion contacts the table portion and clamps anything between the pressing portion and the table portion whereas when the arm is urged towards the horizontal plane the pressing portion is removed from the table portion and releases material on the table portion. The diverging chains have three basic flights. A first flight A in which the diverging chains are substantially parallel to one another, that is they diverge only an amount sufficient to maintain the material between them under tension. The second flight B is where the diverging chains extend at a wide angle and it is this angle which is extremely important in stretching the plastic material. The third flight C of the diverging chains is a return flight to its original position. Covering the first and second flights but not the third flight is suitable heating means 54 for heating the material as it passes through the first and second flights. Any standard hot forced air oven may be used.

The first flight of the diverging chains is referred to as the primary tension and heating section while the second flight is referred to as the heating and spreading section. In operation as the clamps approach point X the pressing portion is urged towards the horizontal position to open a space between the pressing portion and the table. Simultaneously the material is supplied to the feed plate 55 and to position X. The feed plate is used merely to guide the material onto the table of the moving clamps at position X. The pivotal arm disengages the cam bar 56 and the pressing portion falls into a vertical position to clamp the material between the table and the pressing portion. The material is being heated as it is now being conveyed through the first flight of the diverging chains. The heating of the material causes slack to appear which is taken up by the slight diversion during this portion of the run of the chain. A divergence of 1 to 2 inches in 6 feet is sufficient to maintain the material under tension. At point Y the pivotal arms pass a rotating cam 57 which urges the arm towards the vertical position and insures the grip on the material. The diverging chains then pass in their second flight which stretches the material. While being passed through the second flight the material is maintained at the desired temperature to aid in the transverse stretching operation. In the second flight the chains must diverge at an angle $\alpha$ greater than 40° and preferably about 80 to 120°. If the angle is too great, about 170°, the material will tear or slip from the clamping means as the clamping means makes the bend about the sprockets 16 and 19 to start the diverging second flights. The forward speed of the material as it is being transversely stretched in this section is equal to the speed of the material fed to the narrow end of the diverging conveyors times the sign of the angle $\beta$ between the path of the conveyor and the line perpendicular to the direction of feed or the cosine of the angle one-half $\alpha$ between the path of the conveyor and the direction of feed. It is preferred that the angle $\beta$ be from about 14 to 23°. By maintaining the angles of divergence within the ranges described above the material is decelerated enough during the stretching operation to allow for sufficient mobility of the molecules of the warm or heated plastic material to provide excellent transverse stretching and orientation in the transverse direction. When the material has been stretched in the transverse direction the desired amount the diverging chains pass by cam bars 60 and 61. These cam bars are mounted so that they are adjustable to provide for varying amounts of transverse stretch in the material. The cam bars urge the pivitol arms of the clamping means to the horizontal direction and release the material. The clamping means then pass along the third flight back to point X. Mounted along this third flight are cam bars 62 and 63 which maintain the pressing portion and table in the open position to allow cooling of these clamping means prior to gripping the next portion of the material. It is extremely important that the clamping means be sufficiently cool so that when they grip the next portion of the film they do not immediately melt it.

Figure 7:
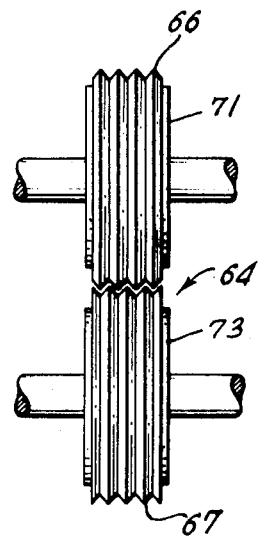
FIG. 7 is an enlarged front view of one pair of belts for gripping the edge of the material and conveying the material after it has been transversely stretched.

The material, as it is released by the clamping means, is immediately picked up and conveyed away from the diverging conveyors and the heated section under complete control and allowed to cool. A means for conveying the plastic material after it has been stretched comprises two sets 64 and 65 of grooved endless rubber belts 66, 67 and 68, 69. Each set comprises an upper endless rubber belt 66 and 68 and a lower endless rubber belt 67 and 69. The belts have grooves in their surfaces and preferably the grooves intermesh, see FIG. 7. The upper belt 66 passes about pulleys 70 and 71 and the lower belt 67 passes about two pulleys 72 and 73. The lower flight of the upper belt and the upper flight of the lower belt pass in contact with each other with the grooves intermeshing. At points Y these belts pick up the material as it is released from the diverging chains 12 and 13 and under positive grip convey it away from the heating means and the diverging chains. A pulley of each upper belt of each set and each lower belt of each set is driven to provide positive drive means for all belts. A metal bar 75 is placed above the lower flight of the upper belt and another metal bar 76 is placed beneath the upper flight of the lower belt on each set to insure that the belts meet each other over their entire flight. The sets are parallel to each other and grip both edges of the transversely stretched material. The material upon reaching the end of the flights of the intermeshing belts is slit by any suitable knife means 77 to remove the selvege and the material then rolled up by standard wind-up mechanisms 78.

It is important that the means for gripping the material as it is removed from the diverging chains grip the material over substantially the entire edge such as a pin conveyor would do as the plastic material is still hot and the spot contact would tend to cause tearing of the material and would not maintain the edges parallel. Though grooved belts have been shown other means such as wide, soft rubber belts or other similar conveying means may be used.

Figure 3:
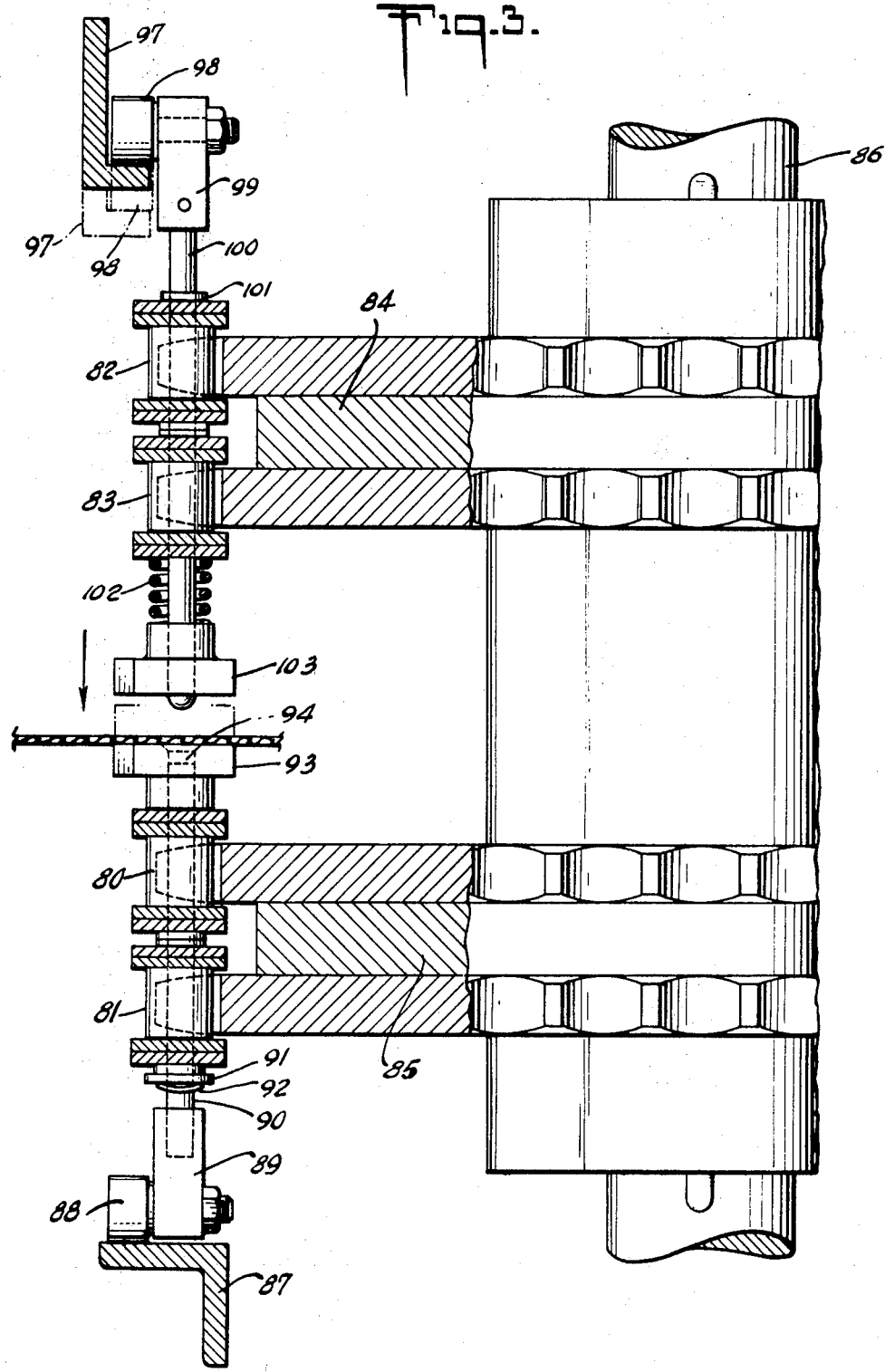
FIG. 3 is an enlarged side view of means for clamping the material to be treated by the apparatus of the present invention.
Figure 4:
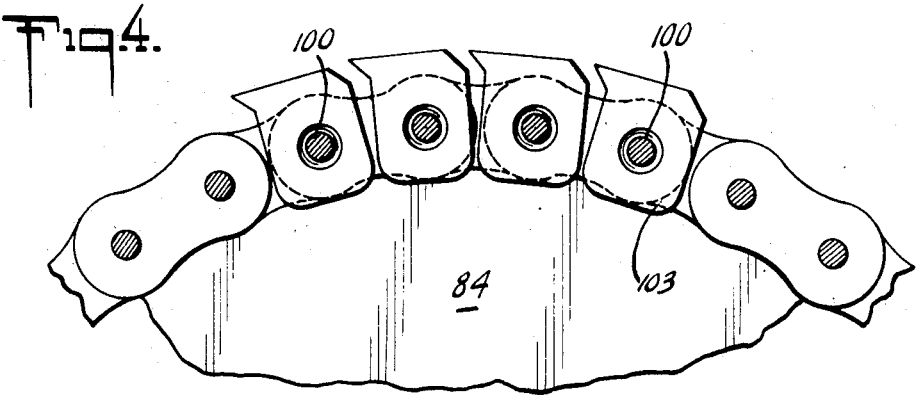
FIG. 4 is a schematic top view of the clamping means depicted in FIG. 3.

In the transverse stretching portion of the apparatus of the present invention it is extremely important that the heated material be securely gripped over its entire edge. If not gripped over its entire edge portion it must at least be gripped at spaces no more than 1 to 2 inches apart. This is important for two reasons; first it insures a uniform grip of the material as it is being transversely stretched and second it allows the material to be released after being transversely stretched and still maintain the edges of the material parallel and prevents excessive necking down of the material. In the transverse stretching operation there is considerable force being placed on the plastic material and if the spaces between clamped portions of the material are too large this force is released over a portion of the length of the material and the material will tear and rip. The clamping means previously described are sufficient to allow restriction of the material in accordance with the present invention as long as each clamping means is placed as close to one another as is reasonably possible and the length of each clamping means is no greater than 2 to 3 inches. Even more desireable clamping means is shown in FIGS. 3 and 4. In stretching the plastic material at such wide diverging angles it is not only important that the material be gripped uniformly along its edges it is also important that it be gripped on the pitch lines of the angle of divergence and when released it be released right on this pitch to provide uniform stretch and maintain the edges of the material parallel when released after being stretched. The closer the clamping means moves right on the pitch line of the chain the closer they stay together as they go about a bend such as sprockets 16 and 19 in FIG. 1. Also, as the clamp moves in the diverging paths the stretching force is not perpendicular to the face of the clamp but at an angle thereto, hence the wider each individual clamp the greater the tendency for the material to slip out sideways from the clamp.

Clamping right at the pitch line may be accomplished by using spaced apart chains which are conveyed around a double set of sprockets and are spaced just sufficiently apart so that clamping means may be placed between the two chains. This is more clearly shown in FIGS. 3 and 4. Two roller chains 80 and 81 are used in the bottom portion and two roller chains 82 and 83 are used in the top portion to give even greater stability and control over the path of movement of the clamping means.

Referring to FIGS. 3 and 4 two double sprocket wheels 84 and 85 are mounted for rotation on a shaft 86. Referring to FIG. 1 such double sprocket mechanisms are used to replace all of the sprockets shown in FIG. 1. Preferably a stationery support rail 87 is positioned underneath the path of the chain belts. A roller 88 rides on this support rail and is rotatably mounted in a block 89. Pinned vertically into the block is a rod 90 and mounted on this rod are two standard chain belts 80 and 81. Each chain belt comprises a series of interlocking upper and lower lengths interconnected by hollow roller portions. These lengths are mounted on the vertical rod by suitable retaining rigs 91 and washers 92. Mounted on top of the double chain belts is a smooth, flat plate 93 which rides in a single horizontal plane. In the center of the plate there is a depression 94.

Mounted just above this support rail and above the upper sprocket is a cam rail 97. This is a solid rail which takes the same path that the chains take, however, at those portions where it is desired that the clamping means be closed the cam rail is omitted and at those portions where it is desired that it be open it has a sloping portion so that it gradually opens the clamping means to its fully opened position. A roller 98 rotates and lies on this cam rail. Mounted on this roller is a block 99 and vertically suspended from this block is a vertical rod 100 pinned to the block. Mounted on this rod are another set of roller chains 82 and 83 which comprise interconnecting upper and lower links and hollow roller portions. These chain belts are mounted on the rod by suitable retaining rings 101. Mounted on the rod beneath the bottom chain belt is a compression spring 102 and mounted at the very bottom of the rod is a smooth gripping plate 103. The rod protrudes slightly from the surface of this smooth plate and is aligned with the depression in the bottom stationery plate. As long as the cam roller rides on the cam rail the plates are spaced apart and the clamping means are open. As soon as the cam rail is removed the cam roller falls off and the rod is urged towards and into contact with the bottom stationery plate with force provided by the spring.

As shown in FIG. 4 such a mechanism allows the clamping means to ride substantially exactly on the pitch line of the sprockets as the diverging conveyors are diverged. By inserting the clamping means as described in conjunction with FIG. 4 into the mechanism shown and described in conjunction with FIGS. 1 and 2 the plastic material is picked up as the chain belts approach and come to point X. The clamping means fall off a suitable cam rail and grip the material right on the pitch line of the sprocket. The clamping means remain closed as the conveyor passes from point X to point Y. They are still on the pitch line as the conveyors are diverged at extreme angles. In place of the adjustable opening means a suitable cam rail is positioned in the area. The cam rail has a sloping entry point and the roller rides up this rail opening the clamping means and releasing the material from the pitch line of the diverging path to be picked up as previously described in conjunction with FIG. 1.

The invention will be further illustrated by the following examples. It should be understood however that although the examples may describe in particular detail some of the more specific features of the invention they are given primarily for the purposes of illustration and the invention in its broader aspects is not to be construed as limited thereto.

EXAMPLE I

An unoriented polyethylene film 6 inches wide and 6 mils thick is fed at a speed of 200 feet per minute to a pair of diverging conveyors as depicted in FIG. 1. It is fed to the narrow end of the conveyors at point X and the clamping means of the conveyors are approximately 6 inches apart. The edges of the film are clamped and moved to point Z where the clamping means of the conveyors are approximately 7 inches apart. The distance from X to Z is approximately 6 feet. The chains diverge at point Z to point Y at an angle of 150°. The forward speed of the film as it is being stretched in the transverse direction is 50 feet per minute and the film is stretched at a ratio of 12:1. At point Y the clamping means are released and the film is fed onto the takeoff grooved rubber belts and rolled up by standard windup mechanisms. The conveyor chains from points X to Z to Y are in an oven and the temperature of the oven is maintained at approximately 270° F. during the entire operation. The distance from the time that the takeoff means picks up the film from the diverging chains to the time that the takeoff means releases the film for takeup by the windup rolls is approximately 3 feet and is sufficient to cool the film prior to windup. The resultant film is highly oriented in the transverse direction and may be readily fibrillated into a web of interconnected fibers.

EXAMPLE II

A substantially unoriented polypropylene plastic netting is fed at a speed of 15 feet per minute to a pair of diverging conveyors as depicted in FIG. 1. The netting has a diamond pattern of about 56 openings per square inch. The netting has a thickness of about 5 mils. The netting is fed to the narrow end of the conveyors at point X and the clamping means of the conveyors are approximately 8 inches apart. The edges of the netting are clamped and moved to point Z where the clamping means of the conveyors are about 9 inches apart. The chains diverge at point Z to point Y at an angle of 120°. At point Y the clamping means are about 48 inches apart so that the netting has been stretched in the transverse direction at a ratio of 6:1. At point Y the clamping means are released and the netting fed onto the takeoff grooved rubber belts. The belts have a lineal speed of about 80 feet per minute and stretch the netting in the longitudinal direction. The netting is heated to about 280° F. during the stretching operations. The netting is allowed to cool and wound-up by standard windup mechanisms. The resultant netting is a crisscross pattern of small diameter oriented filaments having about 4 large openings per square inch.

Although examples of the invention concept have been described the same should not be construed as limited thereby nor to the specific substances or constructions mentioned therein but to include various other equivalent substances and constructions as set forth in the claims appended hereto. It is understood that any suitable changes, modifications and variations may be made without departing from the spirit and scope of this invention.

We claim:

1. Apparatus for continuously transversely stretching plastic sheet material comprising a pair of endless conveyors, a plurality of clamping means mounted along the entire length of said conveyors, said conveyors mounted in a single plane and each conveyor having a first flight, a second flight and a return flight, said first flights being spaced apart, moving in the same direction and diverging from each other at an angle of less than 10°, for applying primary tension on said sheet material, said second flights diverging from each other at an angle of greater than 40°, supply means for supplying the plastic sheet material to the clamping means as said clamping means start said first flight, means for activating said clamping means as they start said first flight to grip the edges of the material, means for heating the material as it passes through said first and second flights, means for deactivating said clamping means to release the edges of the material substantially at the completion of said second flight and means for substantially immediately gripping the material as it is released and conveying the material away from said second flight while maintaining the edges of the material parallel.

2. Apparatus according to claim 1 wherein the clamping means about one another along the entire length of the conveyor and each clamping means has a length of less than 3 inches.

2. Apparatus according to claim 1 wherein the clamping means are mounted substantially on the pitch line of the conveyor.

4. Apparatus according to claim 1 including means for maintaining the clamping means deactivated until returned to the start of the first flight.

5. Apparatus according to claim 1 including means for increasing the longitudinal speed of the material as it is released by the clamping means.

6. Apparatus according to claim 1 wherein the means for immediately gripping the material as it is released and conveying the material away from said second flight comprises two sets of a pair of grooved, endless rubber belts, the belts of each set positioned with the lower flight of one belt immediately above the upper flight of the other belt of said set and with the grooves in the belts intermeshing, one of said sets adjacent the position of the second flight of one conveyor at which the material is released and the other set adjacent the corresponding position on the other conveyor, said sets being parallel to each other.

7. Apparatus according to claim 6 wherein the clamping means are mounted substantially on the pitch lines of the conveyors.

8. Apparatus according to claim 6 wherein the clamping means are mounted substantially on the pitch lines of the conveyors and means for increasing the longitudinal speed of the material as it is released by the clamping means.